June 22, 1965  L. M. VIELLE  3,190,515

CAR TOP RECEPTACLE

Filed April 30, 1963

INVENTOR.
Lester M. Vielle
BY
Roberts Cushman & Grassi
ATT'YS

3,190,515
CAR TOP RECEPTACLE
Lester M. Vielle, S. Oxford Road, West Millbury, Mass.
Filed Apr. 30, 1963, Ser. No. 276,712
1 Claim. (Cl. 224—42.1)

This invention pertains to car top receptacles, such as are employed for protecting luggage, sporting and camping equipment, or the like, during transit, while supported on the roof of a moving motor vehicle, and more especially to a rigid, lightweight receptacle which, in use, is secured to a luggage rack of any available or conventional type fixed to the vehicle top.

Objects of the invention are to provide a car top receptacle which is light in weight but strong and rigid; simple and inexpensive in construction; which protects its contents from the heat of the sun and from contamination or damage by dust or moisture; which comprises a plurality of non-communicating compartments, each individually sealed so as to prevent the transmission of odors, vapors, dust or the like from one compartment to the next; to provide a multi-compartment receptacle provided with doors giving access from the exterior to each respective compartment and which are leak-tight when closed; to provide a car top receptacle whose exterior contour is such as to minimize air resistance while the vehicle is travelling at high speed and whose shape is such that there is developed a downward component of the air pressure, resultant from the motion of the vehicle, which acts in a direction such as to stabilize the receptacle and the vehicle upon which it is mounted.

Other and further objects and advantages of the invention will be pointed out in the following more detailed description and by reference to the accompanying drawings wherein.

When in the following description specific dimensions are cited, this is merely by way of example and the particular dimensions suggested are not to be regarded as limiting.

Figures 2, 3:
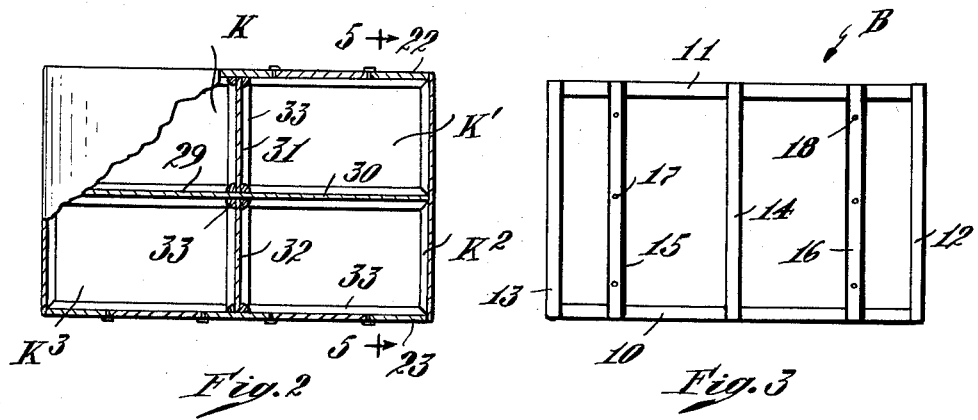
FIG. 2 is a plan view, to smaller scale, with the roof partly broken away to show the interior construction.
FIG. 3 is a plan view, to the same scale as FIG. 2, showing the base of the receptacle as it appears before the floor, side walls and roof have been applied.

Referring to FIG. 3, which is a plan view, looking down, showing the base or foundation frame of the receptacle, without other parts, the numerals 10 and 11 indicate parallel, longitudinal girders which may, for example, be of wood 2 inches in width and ¾ of an inch in thickness and which are spaced apart a distance approximately the desired transverse width of the receptacle. These longitudinal girders 10 and 11 are connected at their front and rear ends, respectively, by the parallel rails 12 and 13 which, like the girders 10 and 11, may be of wood 2 inches in width and ¾ of an inch in thickness, it being understood that the lumber used for the parts of this base or foundation frame should be clear, sound and of a wood light in weight, but selected for its strength and stiffness. Merely by way of example, the base frame may be of a maximum length of 6 feet and a maximum width of 3 feet 10 inches.

This base frame also comprises the central rail 14 (FIG. 3) desirably of the same dimensions as the rails 12 and 13; and, preferably, intermediate rails 15 and 16 which are located somewhat nearer the end rails 12 and 13 than to the middle rail 14, to accommodate fastener devices and to insure the requisite stiffness at that part of the frame which will contact the luggage rack on the top of the vehicle. Desirably, for this particular reason, the rails 15 and 16 may be somewhat heavier than the rails previously referred to, for instance they may be 2½ inches in width. As shown, the ends of the transverse rails overlie the girders 10 and 11 and, at the places where this overlap occurs, the transverse rails are secured to the longitudinal girders by suitable fastening means, for example wood screws. To facilitate the attachment of the receptacle to luggage racks of usual type, the rails 15 and 16 may be provided with a series of openings 17, 18, or the like, for the reception of suitable bolts which will extend down through properly located openings in the luggage rack.

Figure 1:
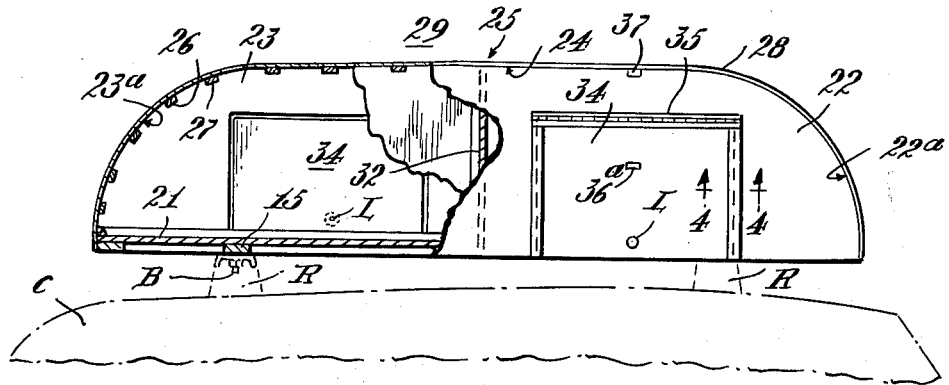
FIG. 1 is a side elevation with parts broken away to show the interior construction, illustrating a car top receptacle embodying the present invention and showing it as mounted in position of use upon a conventional luggage rack attached to the top of a motor car, the rack and car top being indicated in broken lines.

In FIG. 1 of the drawings, portions of two conventional luggage racks R are shown as mounted upon the roof of the vehicle C, and a bolt B is shown as extending downwardly from the rail 15 and through an opening in the rack R with a nut engaging the lower end of the bolt for securing the parts together.

Figures 4, 5:
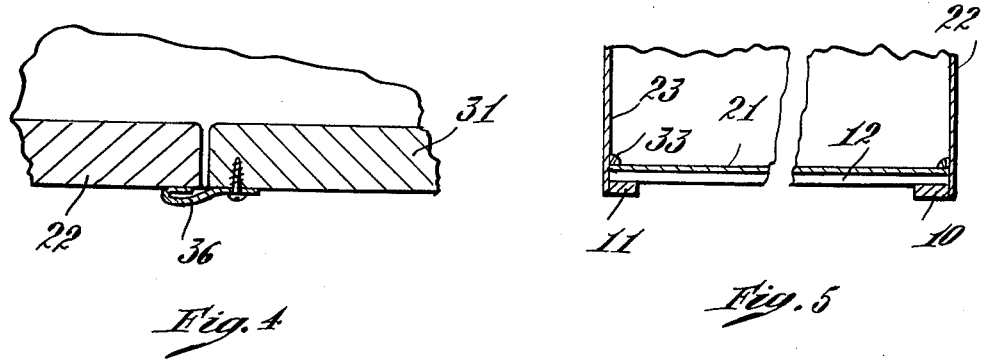
FIG. 4 is a fragmentary horizontal section, to larger scale, on the line 4—4 of FIG. 1, illustrating a desirable arangement whereby the entry of moisture or dust into one of the interior compartments at the door opening is prevented.
FIG. 5 is a fragmentary vertical section on the line 5—5 of FIG. 2.

A floor 21 (FIG. 5), for example of plywood, ⅜ of an inch in thickness, is arranged to overlie the base frame as shown in FIGS. 1 and 5, this floor being rigidly secured to the base frame in any suitable manner as, for example, by wood screws.

Vertical side walls 22 and 23 (FIGS. 2 and 5) extend upwardly from this base frame, the lower margins of these side walls being secured to the base frame by appropriate fastening means and desirably being so arranged that the lower edges of these walls are substantially flush with the lower surfaces of the girders 10 and 11. These sidewalls may, for example, be of plywood ⅜ of an inch in thickness.

As shown in FIG. 1, these side walls are shaped to provide arcuate edges 22a and 23a at their opposite ends, the edges being here shown as approximately 90° arcs, while the upper edge of the side wall, as indicated at 24, is approximately horizontal although preferably, from the midpoint 25 of the side wall it slopes downwardly both forwardly and rearwardly at a very small angle to the horizontal, for example, an angle of from 1½° to 5°, merging at its forward and rearward ends with curved arcuate edges 22a and 23a respectively. The upper edge of each side wall has a series of spaced notches, here shown as rectangular in shape and approximately ¾ of an inch in width and of a depth of ⅜ of an inch, for the reception of the ends of a series of transverse ribs 27. These ribs are of the same cross-sectional dimensions as the notches and the ends of the ribs are fitted down into the notches in the opposite side walls so that the upper surfaces of the ribs are flush with the edge of the corresponding side wall. These ribs form a support for the roof 28 of the receptacle which is preferably a single sheet of aluminum of suitable thickness to provide the requisite strength for resisting the air pressure to which it may be subjected and which is preferably polished on the exterior surface at least, so as to reflect the heat rays of the sun. This sheet of aluminum is of a width such as to extend transversely from one side wall to the other and of a length such that, when stretched tightly over the ribs 27, its opposite ends may be secured to the end rails 12 and 13 respectively of the base frame by appropriate fastening means whereby the sheet aluminum is held tightly down against the ribs. The aluminum sheet may likewise be secured by appropriate fastening means to each of the ribs 27 and at close intervals to the upper edges of the side walls 22 and 23.

As illustrated in FIG. 2, the interior of the receptacle, as thus far described, is divided by rigid partitions 29, 30, 31 and 32 into four separate compartments K, K¹, K² and K³, these partitions being, for example, of plywood ⅜ of an inch in thickness. The partitions extend from the floor 21 to the roof 28, being suitably notched at their upper edges, where necessary, to receive the ribs 27 and, at their junctions with other parts being fixed thereto and fitting between ¾ inch quarter-round strips of wood or equivalent material operative to seal the joint between meeting parts thereby to prevent the passage of odors or dust or moisture from one compartment to the next, some of these quarter-rounds being indicated at 33.

Each of the side walls 22 and 23 is provided with two door apertures opening into the compartments at the corresponding side of the receptacle, these door openings being, for example, 1½ feet in horizontal dimension and 13 inches in vertical dimension. Each of these openings is provided with a closure or door 34 which is hinged at its upper edge to the corresponding side wall by a piano hinge 35. A sealing strip 36 (FIG. 4) extends along each side edge of each door so as to overlap the exterior surface of the side wall and thus prevent the entry of moisture or air into the corresponding compartment. These sealing strips are preferably of resilient sheet material, for example, thin rust-resistant metal, and so shaped that when the door is closed, they make resilient contact with the outer surface of the side wall. Each door may be provided with a conventional lock L (FIG. 1) and preferably with a plate 36a (FIG. 1) of ferrous metal, for example soft sheet iron, which is designed, by contact with a permanent magnet 37, fixed to the exterior surface of the side wall, to hold the door open when the door is raised to the vertical position.

As above noted, the roof of the receptacle is slightly higher at the midpoint of its length than at other places, the maximum vertical height at the midpoint being, for example, 19 inches, while at a distance of 13 inches from the extreme end of the base, the vertical height is 18 inches, the slope of the exterior surface of the roof between these points thus being very slight. As already suggested, the exterior surface of the aluminum sheet is desirably bright and polished so as to reflect as much of the sun's heat as possible and, for the same purpose, the exterior surfaces of the side walls, if of wood, will be coated with heat-reflecting material, for instance aluminum paint.

While the device as herein described is, in general, of wood with the exception of the roof, it is obvious that a receptacle having the same general characteristics might be made entirely of suitable light metal or of plastic, either molded to shape or of assembled parts shaped from sheet plastic, in particular, from sheet plastic suitably reinforced by inclusions of other materials.

While the arrangement, as here shown, has partitions dividing it into four separate compartments, it is obvious that, if desired, it might be divided into a lesser number of compartments, or that for certain purposes the partitions might be omitted altogether so as to provide a single large compartment. In the latter event, a lesser number of doors would obviously be desirable.

While certain desirable arrangements have herein been described and illustrated, it is to be understood that the invention is broadly inclusive of any and all modifications falling within the scope of the appended claim.

I claim:

A car top receptacle of the kind which comprises a floor carried by a rigid base frame designed to rest upon a conventional luggage carrier and having means for securing it to a luggage carrier, whereby the base frame and floor are held in spaced relation to the car top, the receptacle also comprising horizontally spaced, right and left vertical and parallel rigid side walls, means fixedly securing the lower edge portions of the respective side walls to the base frame, each side wall having therein at least one door giving access to the interior of the receptacle, the receptacle also having a roof consisting of a unitary sheet of aluminum having a smoothly polished light-reflecting exterior surface, said sheet of aluminum extending from one side wall to the other and having its opposite ends, respectively, secured to the front and rear ends of the base frame, and means securing said sheet of aluminum to the upper edges of the side walls, characterized in that the roof includes arcuate end portions, each of approximately 90° of arc, the center of curvature of each of said arcuate end portions being approximately in the horizontal plane of the floor, the roof top merging smoothly with the respective arcuate end portions and inclining upwardly, at an angle to the horizontal of from 1.5° to 5° toward its midpoint, from its merger with the respective end portions, whereby when the receptacle is mounted upon a car top and the car is travelling at high speed there is developed such a downward component of the air pressure acting upon the forward end portion of the roof and the upwardly inclined forward portion of the roof top as to stabilize the receptacle and the vehicle upon which it is mounted.

References Cited by the Examiner

UNITED STATES PATENTS

| | | | |
|---|---|---|---|
| 1,578,276 | 3/26 | Foose | 312—287 X |
| 1,804,868 | 5/31 | Gage. | |
| 2,812,992 | 11/57 | Lysen. | |
| 2,985,350 | 5/61 | Taccolini. | |
| 3,078,133 | 2/63 | Schauer | 312—223 |

FOREIGN PATENTS 497,112  10/53  Canada.

HUGO O. SCHULZ, *Primary Examiner.*

MORRIS TEMIN, *Examiner.*